H. A. LAYCOCK.
LOAD DISTRIBUTING APPARATUS.
APPLICATION FILED OCT. 2, 1912.
1,096,930.
Patented May 19, 1914.
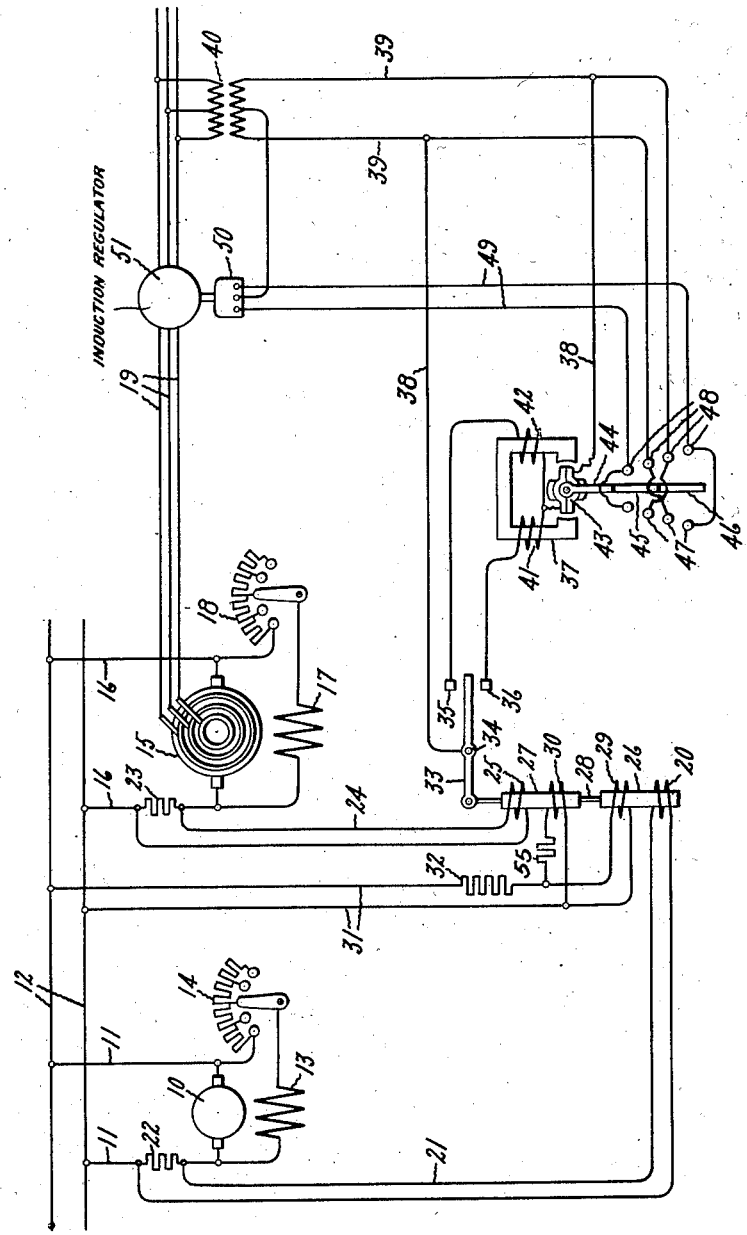
WITNESSES:
J. Earl Ryan
J. Ellis Glen
INVENTOR:
HARRY A. LAYCOCK,
BY Albert G. Davis
HIS ATTORNEY.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

LOAD-DISTRIBUTING APPARATUS.

1,096,930.  Specification of Letters Patent.  Patented May 19, 1914.

Application filed October 2, 1912. Serial No. 723,514.

*To all whom it may concern:*

Be it known that I, HARRY A. LAYCOCK, a citizen of the United States, residing at Schenectady, in the county of Schenectady, State of New York, have invented certain new and useful Improvements in Load-Distributing Apparatus, of which the following is a specification.

My invention relates to means for automatically securing the proper distribution of load upon two dynamo electric machines connected in parallel.

More particularly my invention relates to systems comprising two or more dynamo electric machines connected in parallel in which at least one of said machines is a rotary converter or other apparatus to which alternating current is furnished.

The object of my invention is to provide means which will respond very readily to correct variations from a predetermined distribution of load between such machines.

According to my invention I provide means controlled by the relative currents flowing in the armature leads of the respective machines for varying the voltage of the alternating current which is supplied to one of the machines.

In the present application I specifically disclose my invention in connection with a system comprising a rotary converter in parallel with a direct current generator. The said rotary converter is provided with a well known induction feeder regulator which comprises a stationary coil, a rotatable coil and means for rotating the latter so as to vary the angular displacement of the same with respect to the stationary coil and thus to lower or boost the voltage of the alternating current supplied to said rotary converter. In connection with the aforesaid apparatus I provide means controlled by the relative current flow in the armature leads of the respective machines for controlling the direction of motion of the means for rotating the said coil. This means consists of a reversing relay, the action of which is determined by the position of a contact making arm which is adapted to engage one of two contacts to complete the circuit in a given direction or to assume a position between the said two contacts in which case the circuit is broken. The said circuit may include any suitable means for rotating the regulator coil such as a motor. The contacting lever is connected to a core which is controlled by a pair of coils each of which is in series with an armature lead of one of the machines and which are so disposed as to have opposite effects on the said core. In connection with the said core I have devised an improved means for overcoming the effect of gravity upon the same so that the said core will readily respond to variations in the relative currents flowing in the respective armature leads. This means comprises a pair of oppositely disposed coils which are connected in shunt with the main line and which are so proportioned that the effect of the lower coil is sufficiently greater than that of the upper to neutralize the effect of gravity upon the core.

My invention will be more clearly understood by referring to the accompanying drawing in which a system embodying my invention is shown diagrammatically.

As shown in the aforesaid drawing, the armature 10 of a direct current generator is connected through leads 11 to the mains 12. The said generator is shunt wound having field 13 and a variable resistance 14 in series therewith. The rotary converter 15 is connected through leads 16 to the mains 12. The field 17 and resistance 18 are in shunt with the armature thereof. The rotary converter is supplied with alternating current through mains 19. A portion of the current from the armature 10 passes to the coil 20 through lead 21, a suitable resistance 22 being included in the armature lead for this purpose. The armature lead of the rotary converter is also provided with a suitable resistance 23 causing a portion of the current to pass through the conductor 24 to the coil 25. The coils 20 and 25 are oppositely wound and surround the cores 26 and 27 which are rigidly connected by the bar 28. The coils 29 and 30 are connected in shunt with the mains 12 by means of conductors 31, a suitable resistance 32 being included in the circuit. The resistance of the upper coil 30 is such relative to that of coil 29 (as indicated by the resistance 55 included in the circuit of coil 30) that when the coils are energized the effect of the weight of the cores 26, 27 and the attached parts is just overcome thus causing the position of the said cores to be determined solely by the currents flowing in the coils 20 and 25. The core 27 is connected to one end of the lever 33 which is pivoted at 34. The other end of the said lever is disposed between the contacts 35, 36.

37 is a reversing relay of a well known type. This relay is energized through the leads 38 which are connected across the leads 39 of a transformer 40, the primary of which is connected across the alternating current supply mains. The field of the reversing relay comprises two coils 41 and 42 and the exciting current from the leads 38 pass through one or the other of the said coils depending upon which of the contacts 35, 36 is engaged by the lever 33. By this means the direction of rotation of the armature 43 is controlled. Attached to the armature is the switch arm 44 which comprises the sections 45, 46 which are insulated from each other. Contacts 47 and 48 are disposed on opposite sides respectively so as to be engaged by the switch arm at opposite ends of its swing. Certain of these contacts are connected to the leads 39 and the remainder with the leads 49 which are connected to the operating motor 50 of the induction regulator 51. The said induction regulator and the mechanism connected therewith are well known in the art. The regulator comprises a stationary coil and a rotary coil, a motor for rotating the movable coil and a limit switch (not shown) for breaking the circuit when the movable coil has reached the maximum voltage boosting or lowering position.

The position of the core 27 will be determined by the relative loads on the direct current machine and the rotary converter. On account of the coils 29 and 30 the effect of gravity on the said core and the parts connected thereto is overcome and the position of the said core will be determined entirely by the effect of the current flowing in the armature leads of the two machines. If the load upon the direct current generator becomes greater than a predetermined value for which the apparatus is set, the increase in current flowing in the coil 20 will cause the core and the connected parts to be attracted downwardly. This will cause the lever 33 to engage the contact 35 which will energize the relay 37 so as to cause the motor 50 to turn the movable coil of the induction regulator 51 toward its maximum boosting position. This will cause the voltage supplied to the rotary converter to increase and will cause the machine to assume its proper share of the load. On the other hand should the rotary converter assume too much of the load the effect will be to cause the lever 33 to assume a neutral position or to engage the contact 36. In the neutral position the effect will be to stop the motor 50 and therefore to bring the movable coil of the regulator to a stop. The effect of the engagement of the lever 33 with the contact 36 will be a reversal of the motor 50 so as to cause the movable coil of the regulator 51 to move toward the maximum lowering position. This will cause the voltage supplied to the rotary converter to drop and thereby cause the machine to take less of the load.

Various modifications of the apparatus and system above described will readily suggest themselves to those skilled in the art and are to be considered as coming within the scope of my invention which is set forth in the following claims.

What I claim as new and desire to secure by Letters Patent of the United States, is:—

1. A system comprising dynamo electric machines connected in parallel in which at least one of said machines receives alternating current, and means for regulating the voltage of said alternating current according to the relative loads on the said machines.

2. The combination of a direct current generator connected in parallel with a machine receiving alternating current and furnishing direct current, and a regulator for said alternating current having a stationary coil and a movable coil and means controlled by the relative loads on said generator and said machine for determining the position of said movable coil.

3. The combination of a rotary converter and a direct current generator connected in parallel and of means for varying the voltage of the alternating current supplied to said converter according to the ratio of the loads on the said converter and the said generator.

In witness whereof, I have hereunto set my hand this 1st day of October, 1912.

HARRY A. LAYCOCK.

Witnesses:
 BENJAMIN B. HULL,
 HELEN ORFORD.